(12) United States Patent
Alvarez Garcia

(10) Patent No.: US 12,128,996 B2
(45) Date of Patent: Oct. 29, 2024

(54) SWIM CAP WITH RESPIRATOR AND COMMUNICATION SYSTEM

(71) Applicants: Alejandro Alvarez Garcia, Albandi (ES); POSICIONA CONSULTORES S.L, Alicante Elche (ES)

(72) Inventor: Alejandro Alvarez Garcia, Albandi (ES)

(73) Assignee: DOLPHIN SYSTEM 2020 SL, Alcoy Alicante (ES)

( * ) Notice: Subject to any disclaimer, the term of this patent is extended or adjusted under 35 U.S.C. 154(b) by 881 days.

(21) Appl. No.: 17/277,435

(22) PCT Filed: Sep. 19, 2019

(86) PCT No.: PCT/ES2019/070621
§ 371 (c)(1),
(2) Date: Mar. 18, 2021

(87) PCT Pub. No.: WO2020/058551
PCT Pub. Date: Mar. 26, 2020

(65) Prior Publication Data
US 2022/0033041 A1     Feb. 3, 2022

(30) Foreign Application Priority Data
Sep. 19, 2018   (ES) .............................. ES201800540U

(51) Int. Cl.
*B63C 11/20*     (2006.01)
*A42B 1/12*      (2006.01)
(Continued)

(52) U.S. Cl.
CPC .............. *B63C 11/205* (2013.01); *A42B 1/12* (2013.01); *A42B 1/24* (2013.01); *A63B 33/00* (2013.01);
(Continued)

(58) Field of Classification Search
CPC .. A42B 1/12; A42B 1/24; A42B 1/245; A62B 9/06; B63C 11/16; B63C 11/186;
(Continued)

(56) References Cited

U.S. PATENT DOCUMENTS 4,031,888 A * 6/1977 Walters ................. B63C 11/186
                                                      128/201.19
4,230,106 A * 10/1980 Geeslin ................. B63C 11/186
                                                      128/207.16
(Continued)

FOREIGN PATENT DOCUMENTS

| CN | 106672175 | 5/2017 |
| ES | 1068741 | 12/2008 |
| JP | H0999125 | 4/1997 |

OTHER PUBLICATIONS

International Search Report and Written Opinion in Corresponding Application PCT/ES2019/070621; Mar. 26, 2020 with translation.

*Primary Examiner* — Valerie L Woodward
(74) *Attorney, Agent, or Firm* — Niels Haun; Dann, Dorfman, Herrell & Skillman, P.C.

(57) ABSTRACT

Swim cap comprising a respirator, ear pockets housing headphones, a communication system comprising a microphone integrated in a mouthpiece and a wireless audio/voice communication system for enabling voice communication while swimming and avoiding turning the head to lift it out of the water to breathe.

8 Claims, 2 Drawing Sheets

(51) Int. Cl.
*A42B 1/24* (2021.01)
*A63B 33/00* (2006.01)
*B63C 11/18* (2006.01)
*H04R 1/02* (2006.01)
*H04W 4/80* (2018.01)

(52) U.S. Cl.
CPC ............ *B63C 11/186* (2013.01); *H04R 1/028* (2013.01); *H04W 4/80* (2018.02)

(58) Field of Classification Search
CPC ..... B63C 11/205; B63C 11/207; B63C 11/26; B63C 2011/16; A63B 33/00; H04W 4/80; H04R 1/028
See application file for complete search history.

(56) References Cited

U.S. PATENT DOCUMENTS

| | | | | |
|---|---|---|---|---|
| 5,209,226 A | * | 5/1993 | Goodley | A62B 9/06 128/207.14 |
| 2010/0229858 A1 | * | 9/2010 | Wheelwright | B63C 11/205 2/426 |
| 2016/0134965 A1 | * | 5/2016 | Imran | H04R 1/44 381/151 |

* cited by examiner

SWIM CAP WITH RESPIRATOR AND COMMUNICATION SYSTEM

Related Applications

This application is a national stage application under 35 U.S.C. 371 for International Application No. PCT/ES2019/070621 filed Sep. 19, 2019, which claims the benefit of priority of Spain Priority Application No. ES U201800540, filed on Sep. 19, 2018, the entire contents of which applications are incorporated herein by reference.

OBJECT OF THE INVENTION

The present invention relates to a respirator coupled to a cap for the practice of sport swimming, which has an integrated Bluetooth audio/voice communication system.

Its main aim is allowing voice communication while swimming, without the need to stop, while avoiding having to turn and take the head out of the water to breathe. The mouthpiece is adapted to breathe and allow talking without water entering into the mouth.

The advantages of this invention are as follows:
- It allows voice communication while swimming in motion.
- It avoids turning the head to lift it out and take a breath.
- It is a very comfortable respirator and easy to put on because it is integrated in the swim cap itself.
- It allows listening to music thanks to its Bluetooth connection with any multimedia device that includes this technology.

The industrial application of this invention falls within respirators for the practice of sport swimming, and more specifically respirators integrated in a swim cap with a communication system.

BACKGROUND OF THE INVENTION

Although no invention identical to the one described has been found, we set forth below the documents found that reflect the state of the art related thereto.

Thus, ES1149534U relates to underwater goggles with fastening by means of the swim cap, characterized by a large bathing cap so as to cover the swimmer's forehead, eyes, and front part of the nose. This cap has, in its front part, two holes to clear the eye area, they are identical and symmetrical, following the sagittal axis of the object, and multiple smaller holes around the large ones. Through each one of these two main holes passes a convex lens. The aforementioned invention relates to a device that combines swimming goggles with a bathing cap, while the main invention relates to a combination of a bathing cap with a breathing system and also voice telecommunication.

ES221777T3 describes a diving apparatus, in particular, a respirator, comprising a respirator tube which extends from a mouthpiece as an elastic and flexible breathing tube divided into two sections in which, in position of use, the individual flexible tubes, which extend from the mouthpiece run along and next to the user's head, and in which an air inlet is positioned behind the head: a) a non-return valve is arranged in the individual flexible tubes which prevents the return flow of exhaled air into each of the individual flexible tubes, b) a pressure-relief valve is provided in the mouthpiece, so that when a predetermined air pressure is reached, opens to the exterior environment (water), and c) the outlet opening(s) of the pressure-relief valve is(are) connected on the outside with a part of the flexible tube, which preferably leads the air that leaves the field of vision laterally towards the outside. Said invention relates to a respirator only, without being coupled to any bathing cap or communication system as the main invention does.

ES1150358U proposes a face mask for sport diving of the type that comprise a frame or structure that integrates a lens in its front part and where in its back part it incorporates fitting means configured for fitting the mask to the user's face, that in said structure, close to the lens, an anti-condensation separator is located, and in said separator a non-return means configured for preventing the entrance of water is integrated; and where the structure incorporates an opening that functions as an inlet for a regulator or for a breathing tube, or both. In this case the aforementioned invention relates to a full face mask for diving, but does not comprise any integrated system or device for telecommunication as the main invention does.

ES1073731 U relates to an accessory for underwater breathing consisting of a device that allows a swimmer to breathe normally when snorkelling, comprised by a mouthpiece, two flexible ring sleeves, a straight tube with a length close to 40 cm, an elbow tube, a respirator integral with a float, the respirator having a unidirectional valve, these components being connected to each other with seals and forming a tubular assembly with a length of around 90 cm. As in the previous case, the accessory described is devoid of the voice/sound communication system that incorporates the respirator, object of the main invention.

None of the documents found solves the problems raised as the proposed invention does.

DESCRIPTION OF THE INVENTION

The respirator coupled to cap with communication system, object of the present invention, is constituted from a bathing cap such as that used in water polo, which has its characteristic ear pockets where there are tight headphones of the audio system to listen to music or receive the audio from a call or from the device to which the system is connected.

Regarding the sending of voice-based data via microphone, it is integrated into a capsule-shaped mouthpiece that covers the outer shape of the mouth to allow it to be opened without water entering, and said mouthpiece/capsule is held and adjusted to the face by means of a strap which extends laterally from the cap.

The other attachment of the mouthpiece to the cap consists of a flattened-section and hollow flexible tube which, hidden by the cap, reaches the nape where the blowhole is located that allows the entry and exit of air without water being able to enter thanks to a hatch coupled to a small buoy.

Both the microphone and the headphones are connected to a Bluetooth device that is also in said blowhole.

In a different embodiment the respirator coupled to the cap can dispense with the communication system and be simplified into the mouthpiece/capsule coupled to the cap in the manner described above.

BRIEF DESCRIPTION OF THE DRAWINGS

For a better understanding of the present description, some drawings that represent a preferred embodiment of the present invention are attached.

Figure 1:
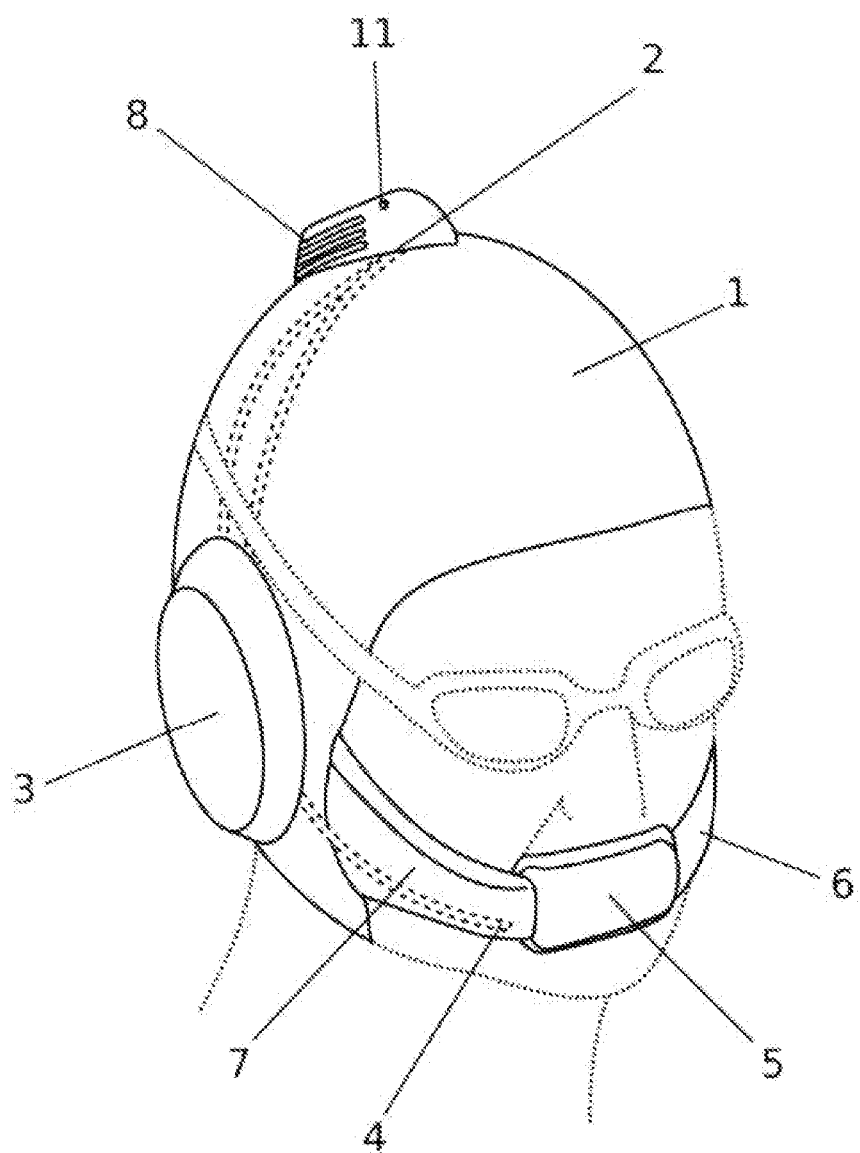
FIG. 1: Conventional perspective view of the respirator coupled to cap with the communication system object of the present invention.
Figure 2:
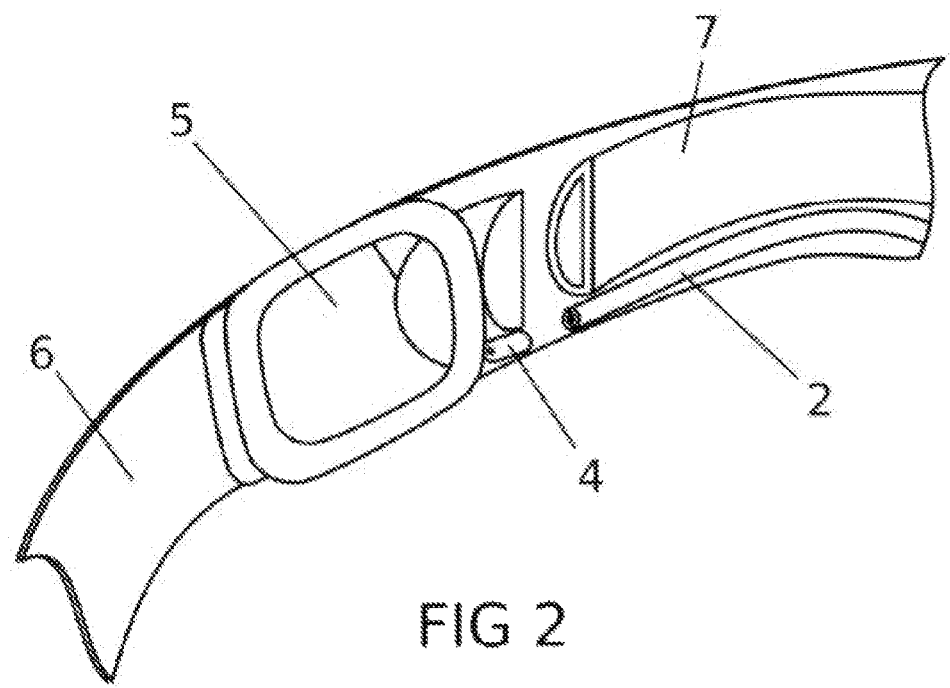
FIG. 2: Detail view of the mouthpiece/capsule with integrated microphone.
Figure 3:
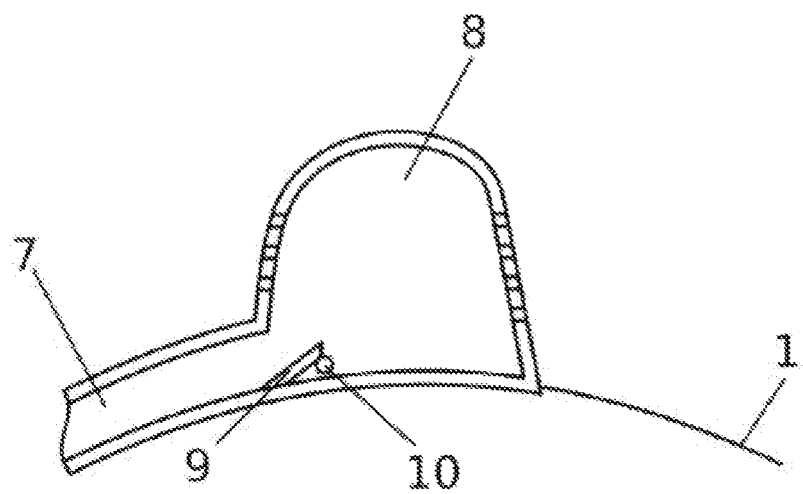
FIG. 3: Schematic view of the blowhole of the respirator object of the invention.

The numerical references that appear in said figures correspond to the following constitutive elements of the invention:

1. Cap
2. Communication system
3. Tight headphones
4. Microphone
5. Mouthpiece/capsule
6. Strap
7. Flattened-section flexible tube
8. Blowhole
9. Hatch
10. Buoy
11. Bluetooth device

DESCRIPTION OF A PREFERRED EMBODIMENT

A preferred embodiment of the respirator coupled to cap with the communication system, object of the present invention, with reference to the numerical references, can be based on a cap (1) such as that used in water polo, which has its characteristic ear pockets where there are tight headphones (3) of the communication system (2). Said audio system has a microphone (4) integrated in a capsule-shaped mouthpiece (5) that covers the outer shape of the mouth to allow it to be opened without water entering, and said mouthpiece/capsule (5) is held and adjusted to the face using a strap (6) which extends laterally from of the cap.

The other attachment of the mouthpiece (5) to the cap (1) consists of a flattened-section and hollow flexible tube (7), which reaches the nape where a blowhole (8) is located that allows the entry and exit of air without that water being able to enter thanks to a hatch (9) coupled to a small buoy (10).

The microphone (4) and headphones (3) are connected to a Bluetooth device (11) that is also located in said blowhole (8).

The invention claimed is:

1. A swim cap (1) with respirator comprising:
   a respirator formed by a capsule-shaped mouthpiece (5) configured to cover the outer shape of the mouth to allow talking without water entering, and said capsule-shaped mouthpiece (5) is connected to a flattened-section and hollow flexible tube (7), where the tube (7) is hidden in the cap (1) and is configured to reach the nape where a blowhole (8) is located.

2. The swim cap (1) with respirator according to claim 1, wherein the blowhole (8) comprises a hatch (9) and a buoy (10).

3. The swim cap (1) with respirator according to claim 1 comprising a communication system.

4. The swim cap (1) with respirator according to claim 3, wherein the blowhole (8) comprises a hatch (9) and a buoy (10).

5. The swim cap (1) with respirator according to claim 3 wherein the communication system comprises a wireless audio/voice communication system (2) with tight headphones (3) and a microphone (4).

6. The swim cap (1) with respirator according to claim 5, wherein the blowhole (8) comprises a hatch (9) and a buoy (10).

7. The swim cap (1) with respirator according to claim 5, wherein the communication system includes:
   ear pockets suitable for inserting the tight headphones (3),
   the microphone (4) integrated in the mouthpiece (5) and fixed by the strap (6), and
   the wireless audio/voice communication system (11) being located on the blowhole (8) to which the microphone (4) and headphones (3) are connected.

8. The swim cap (1) with respirator according to claim 7, wherein the blowhole (8) comprises a hatch (9) and a buoy (10).

* * * * *